Sept. 19, 1967  YUKIO HISHIDA  3,342,295
REPEAT ACTION MECHANISM FOR POWER OPERATED TYPEWRITERS
Filed March 10, 1966  6 Sheets-Sheet 3

Yukio Hishida
INVENTOR

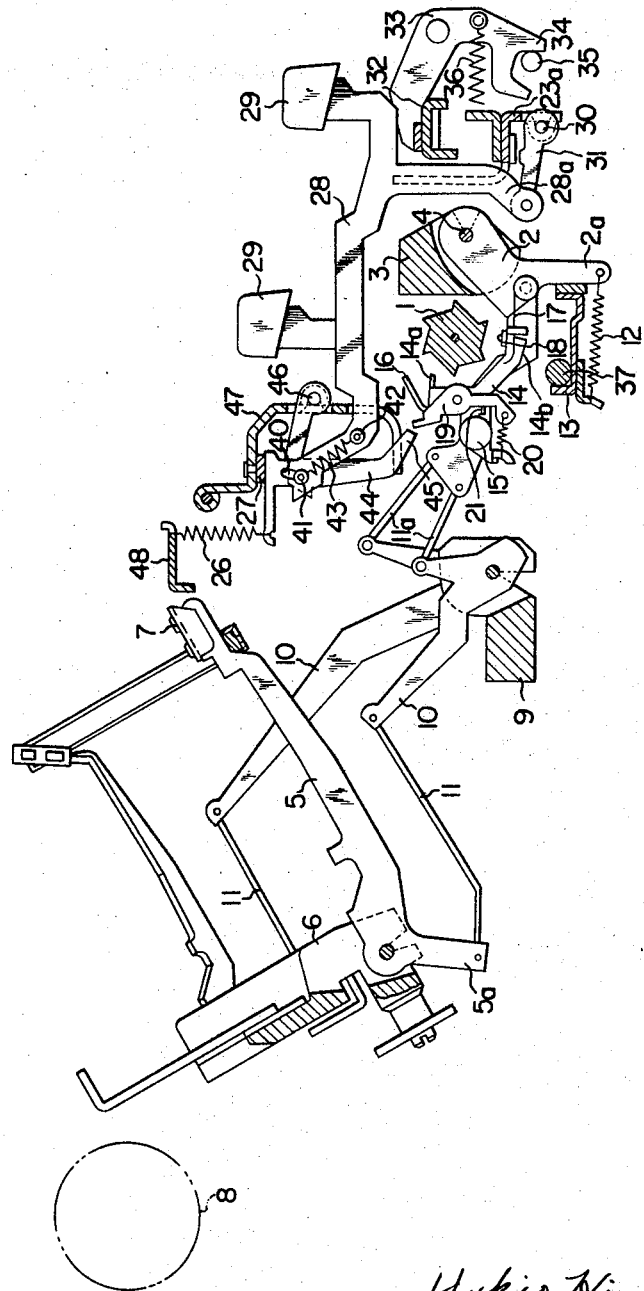

Sept. 19, 1967  YUKIO HISHIDA  3,342,295
REPEAT ACTION MECHANISM FOR POWER OPERATED TYPEWRITERS
Filed March 10, 1966   6 Sheets-Sheet 5
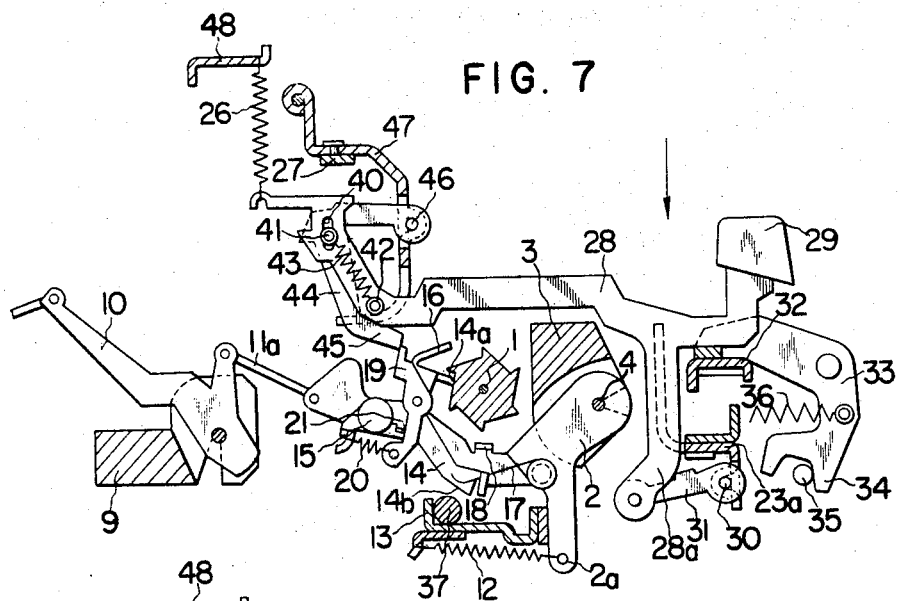
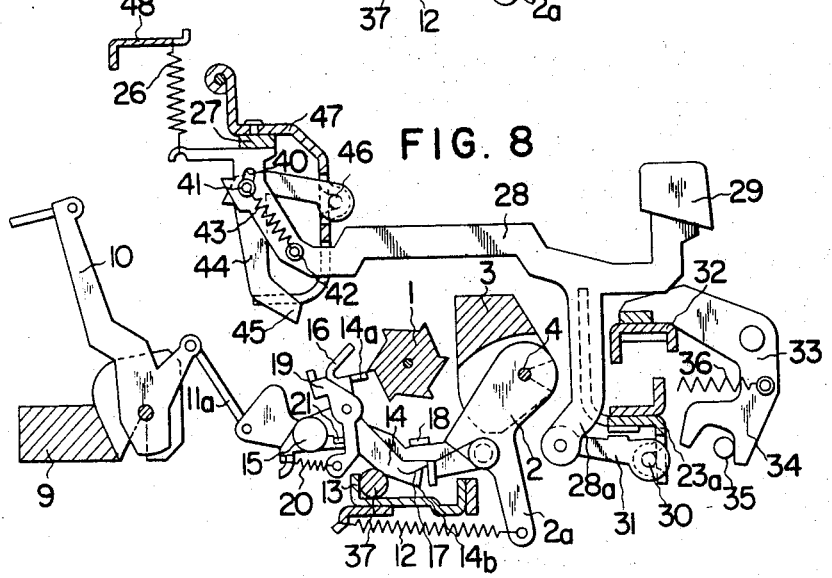
Yukio Hishida
INVENTOR
BY Wenderoth, Lind
and Ponack
attorneys

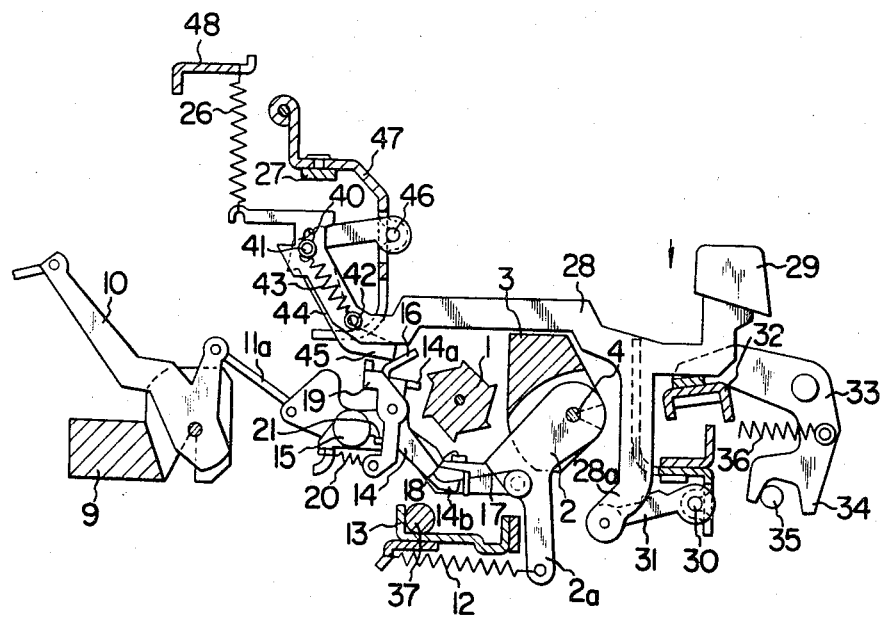

3,342,295
REPEAT ACTION MECHANISM FOR POWER
OPERATED TYPEWRITERS
Yukio Hishida, Nagoya-shi, Japan, assignor to Brother
Kogyo Kabushiki Kaisha, Nagoya-shi, Japan
Filed Mar. 10, 1966, Ser. No. 533,183
Claims priority, application Japan, Mar. 15, 1965,
40/14,926; Sept. 6, 1965, 40/54,541
9 Claims. (Cl. 197—17)

ABSTRACT OF THE DISCLOSURE

A power operated typewriter having a pawl member with a repeat cam in the type-action and an L-shaped operating lever pivoted at one end to the frame and operatively connected to the key lever. Said operating lever operates to directly cause engagement of said pawl member with a power roll and is adapted, when the key lever is depressed into a second position, to be positioned within a path of the repeat cam of the returning type-action so as to re-engage said pawl member with the power roll. Shock absorbing means is further provided between said operating lever and the key lever for preventing direct transmission of the impact force to the key lever.

---

Figure 1:
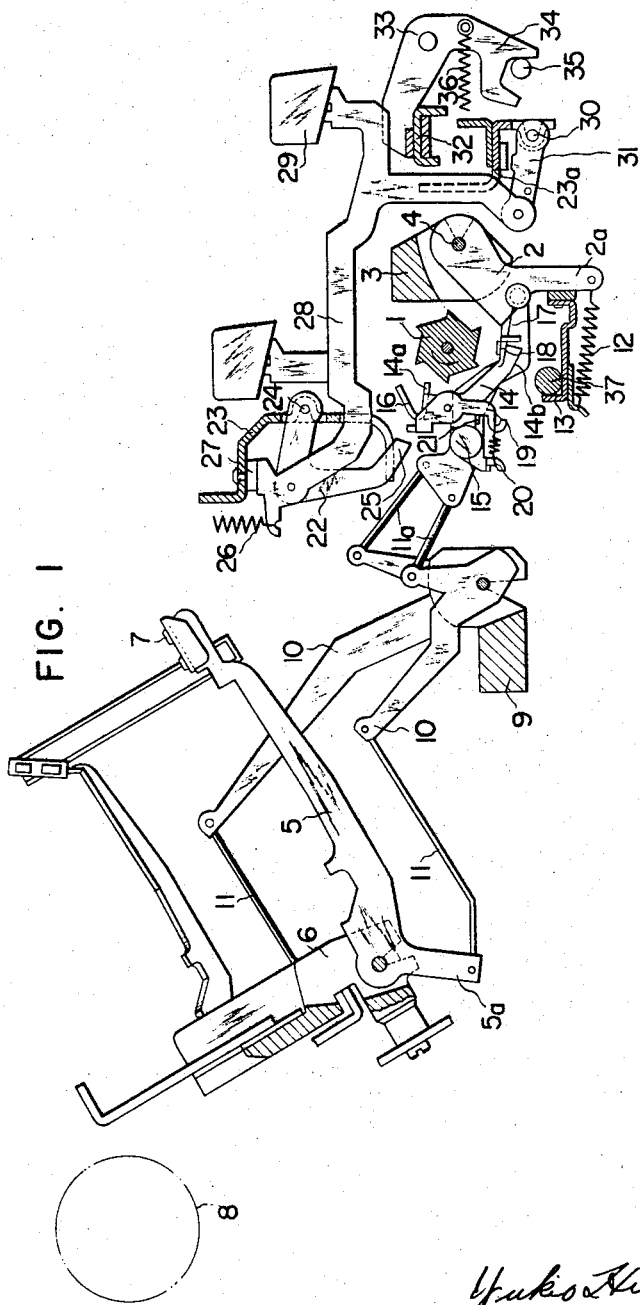

This invention relates to power operated typewriters and more particularly to a mechanism for causing repeat action of driven parts such as a specific type bar or the carriage feed mechanism which are required to undergo repeat operation in a power operated typewriter.

In general, a repeat action mechanism in a power operated typewriter is so adapted that, by depressing a key and holding it in the depressed state, an actuating member connected to a driven part as mentioned above can be caused to engage with a power roll for repeat drive. Heretofore, however, the means for causing the actuating member to engage with the power roll has, itself, been very complicated, and, accordingly, the repeat action mechanism also has been complicated. As a result, the number of parts has been large, and their assembly has been difficult, whereby power operated typewriters known heretofore have been expensive.

It is an object of the present invention to provide a repeat action mechanism in which the engagement means of the actuating member and the power roll is greatly simplified, and, by the simple expedient of providing a cam means at one part of said engagement means, excellent and highly reliable performance is afforded.

An ultimate object of the invention is to afford a substantial lowering of the manufacturing cost of power operated typewriters.

In a power operated typewriter of the type referred to above, an operating lever pivoted on the typewriter frame and a key lever are pin-connected, and a four-bar linkage including the operating lever and the key lever is formed. When the key is depressed to actuate the operating lever and thereby to cause an engagement member to engage with the power roll, an abrupt engagement occurs between the engagement and the power roll, whereby a rather violent impact is produced therebetween.

This impact causes the engagement member to be repulsed, and the operating lever is caused by the repulsed engagement member to be thrust back in the direction opposite to its operating direction. Furthermore, in the case of repeat action accomplished by depressing and holding down the key, the engagement member disengages from the power roll and returns together with the aforementioned actuating member, whereupon it strikes and contacts the operating lever. As a result, the operating lever is thrust back in the direction opposite to its operating direction in the same manner as mentioned above.

The impact force imparted to the operating lever when it is thrust back is transmitted through the key lever and key to the operator's finger, whereby the key touch as felt by the operator becomes poor and causes discomfort.

Another object of the present invention, in another aspect thereof, is to eliminate such discomfort by intercoupling the operating lever and key lever through spring means whereby, when the key lever is depressed, the impact force imparted to the operating lever is absorbed by the spring means and thereby prevented from being transmitted to the operator's finger.

A further object of the present invention is to afford smooth typewriter operation by providing simple engagement means between the key lever and operating lever whereby, during the return movement of the key lever, the operating lever and the key lever can move integrally and be returned quickly to their original positions.

Other objects of the invention, as well as the nature and details thereof, will be apparent from the following detailed description with respect to preferred embodiments of the invention as illustrated in the accompanying drawings.

In the drawings:

FIG. 1 is a left-hand side elevational view, with portions omitted and other portions shown in section and broken away, showing the essential parts of a typewriter incorporating a repeat action mechanism constituting one embodiment of the invention;

FIGS. 2 through 5, inclusive are views similar to that in FIG. 1 indicating respective operational states of the mechanism shown in FIG. 1;

FIG. 6 is a view similar to that in FIG. 1 showing another embodiment of the invention; and FIGS. 7, 8, and 9 are views similar to that in FIG. 6 indicating respective operational states of one type action including one key.

All of the above described views are left-hand side elevational views, the term "left-hand" referring to the left-hand side of the typewriter as viewed from the position of the operator. "Forward" or "front" designates the direction toward or side nearest the operator. Throughout the drawings, like parts are designated by like reference numerals.

Referring first to FIGS. 1 through 5, wherein a single type action is particularly illustrated, there is provided below the keyboard a power roll 1 (shown herein in the form of a snatch roll) which extends laterally across the typewriter frame and rotates continuously in the counterclockwise (as viewed in the figures) direction when driven by an electric motor (not shown) through an appropriate transmission mechanism (also not shown). A support frame 3 is provided parallel to and slightly forward of the power roll 1 and supports a pivot pin 4 about which an actuating member 2 is pivotally supported. The actuating member 2 has an end part projecting away from the pivot pin 4 and toward a point below the power roll 1 and a lower arm 2a projecting downwardly from the end part.

A type bar 5 is pivotally supported on a case 6 and has at its extreme free end a type head 7 confronting a platen 8. The type bar 5 further has a driven arm 5a which is connected to the rear end of the actuating member 2 by way of a link 11, a bellcrank lever 10 pivoted on a support frame 9, a link 11a, and other parts described hereinafter.

A tension spring 12 is stretched between a part 13 of the typewriter frame and the lower arm 2a of the actuating member 2 and functions to urge the actuating member 2 toward the power roll 1. The frame part 13 engages the lower arm 2a and thereby serves as a stop for holding the actuating member 2 in its original position as shown in FIG. 1 against the tension force of the spring 12.

An engagement member 14 is supported above the actuating member 2 so that it is rotatable about a pivot 15 which is parallel to the power roll 1, the engagement member 14 having a pawl 14a engageable with the power roll 1, a repeat operation cam surface 16, and a disengagement cam 14b. A spring 17 is provided to impart a moment tending to rotate the engagement member 14 in the counterclockwise direction for causing the pawl 14a to separate from the power roll 1. A stop 18 is provided on the actuating member 2 to hold the engagement member 14 in its original position relative to the actuating member 2 as indicated in FIG. 1 against the force of the spring 17.

An auxiliary member 19 is pivoted on the engagement member 14, and a tension spring 20 is stretched between this auxiliary member 19 and the engagement member 14, which is provided with a stop 21 for holding the auxiliary member 19 in its original position relative to the engagement member 14 as indicated in FIG. 1. The auxiliary member 19 can rotate independently in the counterclockwise direction against the force of the spring 20.

A sub-frame 23 is provided above and to the rear of the power roll 1 and pivotally supports, about a pivot 24, an operating lever 22 having a downwardly and forwardly extending operating arm 25 which is engageable with the auxiliary member 19 in its original position when the operating lever 22 rotates about the pivot 24. A tension spring 26 is stretched between a part of the sub-frame 23 and a rearwardly projecting arm of the operating lever 22. A part of the subframe supports a stop 27 for holding the operating lever 22 in its original position as indicated in FIG. 1 against the force of the spring 26.

A key lever 28 provided with a key 29 at its forward end and having a rearwardly extending arm and a downwardly extending arm is supported by pin joints at the ends of said arms, respectively, on a part of the operating lever 22 and on the free end of a support lever 31, the other end of which is pivoted on a pivot 30 on the sub-frame 23a. Accordingly, there is formed a four-bar linkage the movable members of which are the operating lever 22, the key lever 28, and the support lever 31.

Below the forward part of the key lever 28, there is disposed a rest bar 32 fixedly secured to the end of one arm of a bent lever 33 which is pivoted at its midpoint on the typewriter frame and has another arm extending downwardly and having a forked end 34. A limit pin 35 fixed to the frame is disposed within the fork 34 for engagement with the inner parts of the prongs of the fork. A tension spring 36 is stretched between the frame and a part of the lower arm with the fork 34 of the lever 33 and thereby exerts a force urging one of the prongs of the fork toward the limit pin 35. Accordingly, the rest bar 32 is held by the spring force in its upper position as indicated in FIG. 1 but can be forced downwardly until the other prong of the fork 34 engages the limit pin 35.

A disengagement bar 37 extending laterally across the typewriter frame is fixed in a position below the aforementioned actuating member 2 where it is engageable by the aforementioned disengagement cam 14b of the engagement member 14.

The repeat action mechanism of the above described composition and arrangement of parts according to the invention operates in the following manner.

Figure 2:
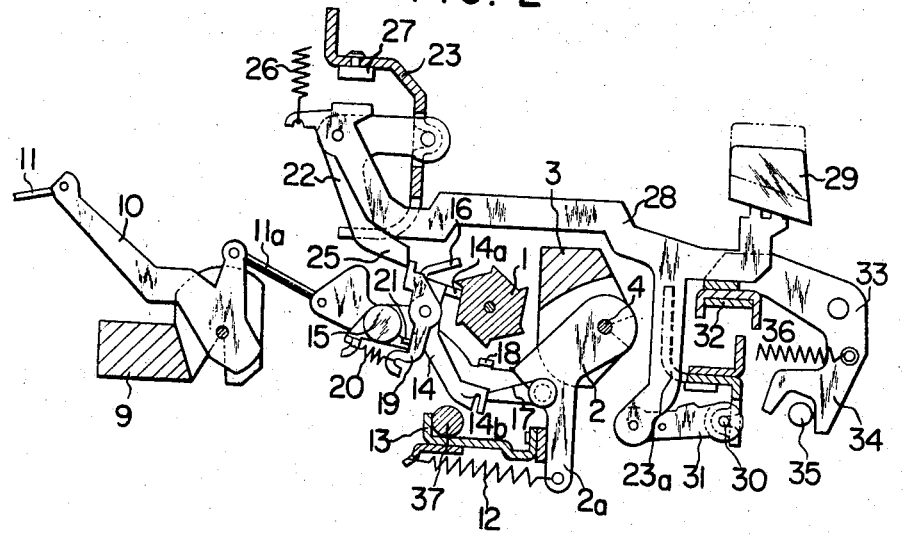

As indicated in FIG. 2, when the key 29 is depressed, the resulting downward movement of the key lever 28 causes the operating lever 22 to rotate counterclockwise about the pivot 24, whereby the operating arm 25 of the lever 22 causes the auxiliary member 19 to rotate clockwise. Since the auxiliary member 19, through the action of the spring 20 and the stop 21, causes the engagement member 14 to rotate clockwise together against the force of the spring 17 as described hereinabove, the pawl 14a on the engagement member 14 engages with the power roll 1. Consequently, the actuating member 2 is caused to rotate counterclockwise as it stretches the spring 12, thereby actuating the type bar 5 through the link 11a, bellcrank lever 10, and link 11.

Figure 3:
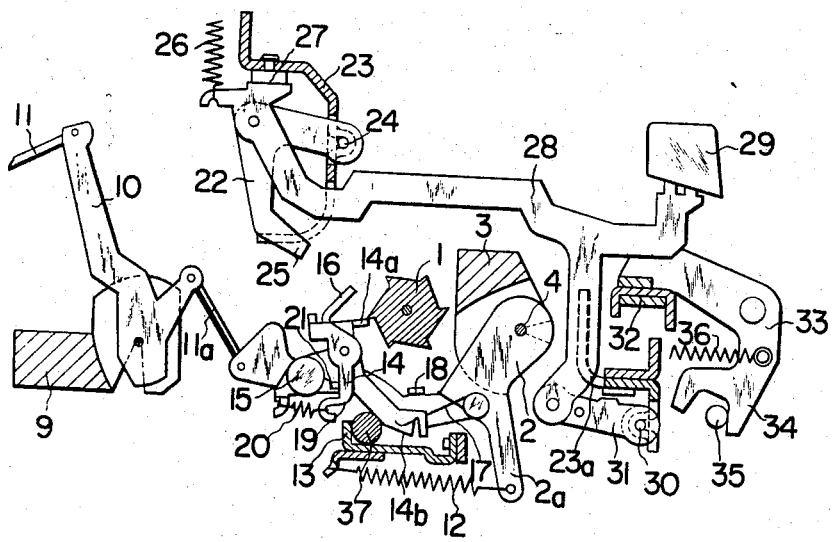

When the engagement member 14 engages with the power roll 1, its disengagement cam 14b is projecting downwardly below the actuating member 2 and, as the actuating member 2 rotates, engages with the disengagement bar 37 as indicated in FIG. 3, whereby the movement of the cam 14b together with the actuating member 2 is blocked. Consequently, the engagement member 14 is rotated counterclockwise relative to the actuating member 2, and, as a result, its pawl 14a is caused to disengage and separate from the power roll 1.

When the pawl 14a is disengaged, the engagement member 14 is caused by the force of the spring 17 to return to its original position relative to the actuating member 2, which is simultaneously caused to return to its original position by the force of the spring 12 due to energy stored therein by stretching as described hereinabove. During this return operation, the pawl 14a of the engagement member 14 moves out of the path of the power roll 1 and, ordinarily, does not engage again with the power roll 1.

Figure 4:
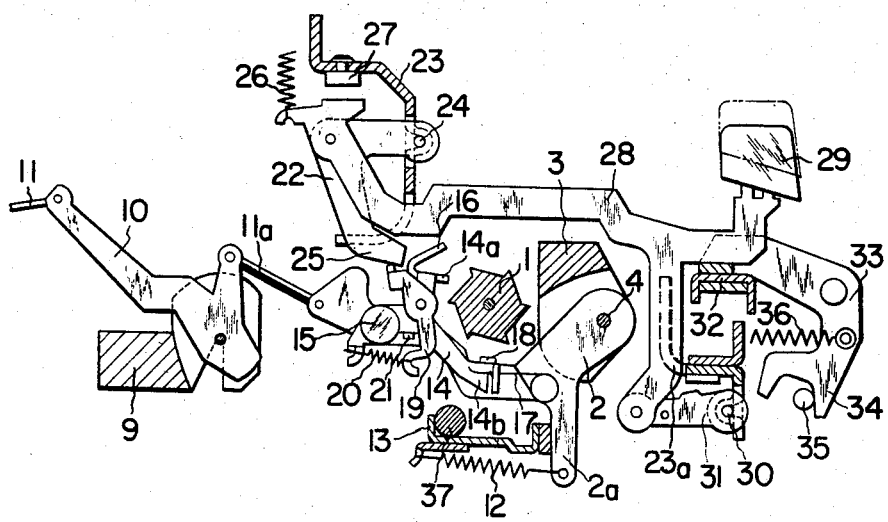

When, at the time the above described return operation is completed, the key 29 is held in its depressed state at the position of its engagement with the rest bar 32 as indicated in FIG. 4, the operating arm 25 is in a position for engagement with only the auxiliary member 19 and causes the auxiliary member 19 to rotate in the counterclockwise direction together with the return of the actuating member 2. Since the engagement member 14 is being pressed against the stop 18 by the force of the spring 17 as described hereinabove, it cannot rotate further in the counterclockwise direction. Consequently, only the auxiliary member 19 rotates relative to the engagement member 14, and one cycle of operation is completed when the actuating member 2 abuts against the frame part 13.

Figure 5:
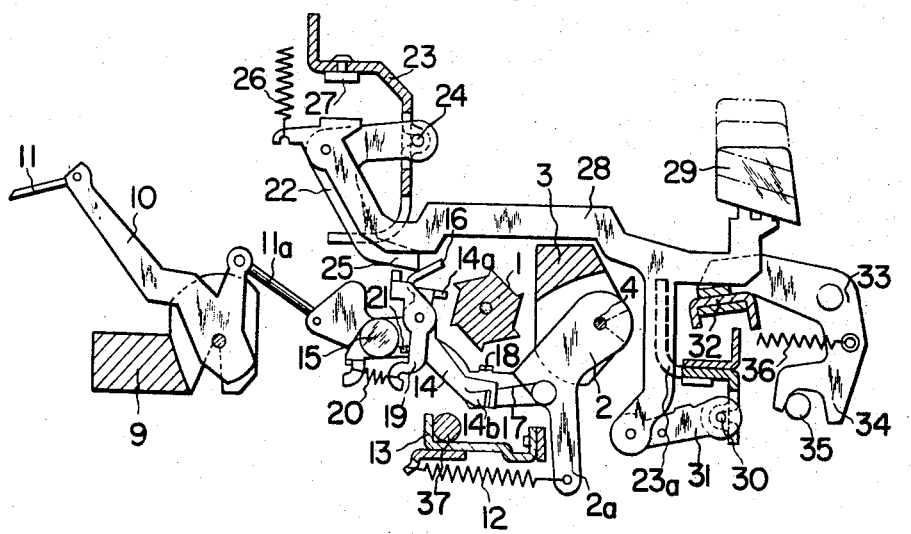

When, at the time of completion of the above described return operation, the key 29 is depressed to a position wherein, as indicated in FIG. 5, the key lever 28 is pressing down the rest bar 32 against the force of the spring 36 to cause the other prong (the left-hand prong) of the fork 34 to contact the limit pin 35, the operating arm 25 is projected into the path of the repeat operation cam surface 16 on the engagement member 14 held in its original position relative to the actuating member 2. Since the repeat operation cam surface 16 contacts the end of the operating arm 25 together with the return of the actuating member 2, the engagement member 14 is caused by the cam action thereof to rotate clockwise relative to the actuating member 2, and the pawl 14a is again brought into engagement with the power roll 1, whereupon the succeeding operational cycle is begun.

This operation is continuously repeated as long as the key 29 is held in the last-mentioned depressed position, whereby repeat action is accomplished. That is, when the key 29 is depressed to the first position to cause the key lever 28 merely to contact the rest bar 32 as indicated in FIG. 4, a single operation is carried out; but when the key 29 is depressed to and held at the second position to cause the key lever 28 to descend together with the rest bar 32, repeat action is carried out.

In another embodiment of the invention as illustrated in FIGS. 6 through 9, inclusive, the composition and arrangement of parts are similar to those of the above described mechanism except for parts between the actuating end of the key lever 28 and the engagement member 14 and related parts. These parts as described below have shock absorbing means for absorbing the impact imparted by the operating lever and preventing this impact from being transmitted to the key lever.

Referring to FIGS. 6 through 9, the repeat action mechanism shown therein is provided with an operating lever 44 pivoted on a shaft 46 supported by a sub-frame 47. The operating lever 44 has a downwardly extending operating arm 45 which, when the operating lever 44 rotates about the shaft 46, is engageable with an auxiliary member 19 (similar to that described hereinabove in connection with the first embodiment of the invention) in its original position.

The key lever 28 in this example is provided at its actuating end with a slot shaped hole 40 in which there is slidably engaged a pin 41 embedded at its root end in the operating lever 44. A tension spring 43 is stretched between the outer tip of the pin 41 and a pin 42 embedded at its root end in the key lever 28 and functions to pull the pin 41 against the lower end of the slot shaped hole 40 thereby to establish a constant tendency for the key lever 28 and the operating lever 44 to move integrally. A tension spring 26 is stretched between a sub-frame 48 and the extreme rear end of the key lever 28, and a stop 27 secured to the sub-frame 47 is provided to limit the upward movement of the key lever 28 and to hold it in its original position as indicated in FG. 6 against the force of the spring 26.

The remainder of the parts of the mechanism are respectively similar to those of the mechanism described hereinbefore with reference to FIGS. 1 through 5, inclusive. The mechanism of the above described construction according to the invention operates in the following manner.

As indicated in FIG. 7, when the key 29 is depressed, the operating lever 44 is caused by the spring 43 to follow the movement of the key lever 28 and thereby rotate about the shaft 46, and the operating arm 45 thereof operates to actuate the auxiliary member 19 in clockwise rotation. The auxiliary member 19 causes the engagement member 14 to rotate together therewith, through the action of the stop 21, in the clockwise direction against the force of the spring 17. Consequently, the pawl 14a of the engagement member 14 is caused to rotate counterclockwise as it stretches the spring 12, thereby actuating the type bar 5 through the link 11, bellcrank lever 10 and link 11.

When the key 29 is depressed to cause, by way of the operating lever 44 and auxilary member 19, the engagement member 14 to engage with the power roll 1, an impact occurs between the engagement member 14 and the power roll 1. Fundamentally, the functional purpose of this mechanism is achieved as long as the actuating member 2 for driving driven parts such as the type bar receives a downward force imparted by the power roll 1. Accordingly, this purpose can be amply achieved if the engagement member 14 supported on the actuating member 2 is subjected to merely a downward force upon engaging with the power roll 1.

In an actual case, however, since the engagement member 14 is suddenly pressed toward the continuously rotating power roll 1 to engage therewith, the engagement member 14 is subjected not only to a downward force imparted by the power roll 1 but also to a repulsion force due to this sudden engagement so as to repulse or thrust back the engagement member 14. The engagement member 14 which has received this repulsion force from the power roll 1 and has been repulsed in this manner transmits this repulsion force by way of the stop 21 to the auxiliary member 19 thereby imparting thereto a tendency to rotate counterclockwise.

Since the operating lever 44 at this time is still being held in the state wherein it is urging the auxiliary member 19 in the clockwise direction, the repulsive force imparted to the auxiliary member 19 is instantaneously imparted directly to the operating lever 44, which thereupon is thrust upwardly. Accordingly, if the key lever 28 and the operating lever 44 were simply pin-jointed to each other, the repulsive force would be transmitted directly to the key lever 28 and thereby through the key 29 as a shock force to the finger of the operator.

In the mechanism according to the invention, however, the key lever 28 and the operating lever 44 are coupled in a freely shiftable manner by the slot shaped hole 40 provided on the side of the key lever 28 and the pin 41 engaged slidably with the slot shaped hole 40 and fixed on the operating lever 44, said two levers being connected by the spring 43. Accordingly, the operating 44 thrust upwardly by the repulsive force shifts upwardly against the force of the spring 43 within the range of movement of the pin 41 permitted by the slot shaped hole 40, whereby there is no direct transmission of the repulsive force to the key lever 28. That is, the repulsive force is almost completely absorbed by the spring 43.

When the engagement member 14 engages with the power roll 1, its disengagement cam 14b is protruding below the actuating member 2 and, as the engagement member is pushed downwardly and the actuating member 2 rotates, engages with the disengagement bar 37 as indicated in FIG. 8, thereby being rotated counterclockwise relative to the actuating member 2. As a result, the pawl 14a on the engagement member 14 disengages from the power roll 1.

When the pawl 14a so disegages, the engagement member 14 is rotated counterclockwise by the force of the spring 17, and the actuating member 2 is rotated clockwise by the force of the spring 12, undergoing a return movement about the pivot pin 4 toward its original position, together with the engagement member 14, as indicated in FIG. 6. During this return movement, the pawl 14a on the engagement member 14 passes out of the path of the power roll 1 and, ordinarily, does not engage again therewith. Thus, the actuating member 2 returns to its original position shown in FIG. 6.

On one hand, when the downwardly depressed key 29 is released, the key lever 28 is quickly returned by the spring 26 stretched between the sub-frame 48 and the key lever 28 and, abutting against the stop 27, is held in its original position as shown in FIG. 6. At the same time, the operating lever 44 also returns to its original position integrally with the key lever 28 as its pin 41 is held at the lower end of the slot shaped hole 40 in the key lever 28 as indicated in FIG. 6.

Repeat action of the typewriter is effected as mentioned hereinbefore by depressing the key 29 fully to a position such that the key lever 28 pushes the rest bar 32 until the rear prong of the fork 34 contacts the limit pin 35 and holding the key 29 in this position.

More specifically, the depressing of the key 29 as described above causes the operating lever 44 to move into the path of the repeat operation cam surface 16 of the engagement member 14 held in its original position relative to the actuating member 2. Then, as the actuating member returns, the operating arm 45 of the operating lever 44 contacts and engages with the repeat operation cam surface 16 and, at the same time, causes the auxiliary member 19 to rotate counterclockwise relative to the engagement member 14. The cam action of this cam surface 16 causes the engagement member 14 to engage again with the power roll 1 and start the succeeding operation. This action is repeated as long as the key 29 is depressed as described above, whereby repeat action is accomplished.

When the engagement member 14 disengages from the power roll 1 and returns together with the actuating member 2 for the suceeding repetition of the operational cycle and contacts the operating arm 45 at the end of the operating lever 44, an impact occurs therebetween. This impact imparts a repulsive force to the operating lever 44, which is thereby thrust upward, but this repulsive force is almost completely absorbed by the spring 43 provided between the operating lever 44 and the key lever 28, similarly as in the aforedescribed case, and is not transmitted to the operator.

In this manner, for both single action and repeat action, the impact imparted to the operating lever 44 is almost completely absorbed by the spring 43 within the range of movement of the pin 41 in the slot hole 40.

While the foregoing disclosure relates to an example of type action of the moving parts associated with a single type bar, it will be apparent to those skilled in the art that the present invention can be readily applied also to various other typewriter mechanisms requiring repeat action as, for example, the type feed mechanism and the line feed mechanism.

As described above, the present invention provides a repeat action mechanism for power operated typewriters, which mechanism is characterized in that an engagement member on an actuating member is operated by an operating arm positioned always slightly apart therefrom and is caused to engage with a power roll thereby to transmit the motive power of the power roll to parts to be driven, and, by providing a cam surface on the engagement member, and moverover, causing the operating arm to move into the path of the cam surface at the completion of return movement of the actuating member, single action or repeat action can be selectively carried out.

Furthermore, the operational coupling means between the type action and its operating means according to the invention is very simple, whereby the construction of the parts thereof can be greatly simplified. Moreover, by the introduction of a very simple means, a repeat action mechanism of highly reliable action is provided. Accordingly, the mechanism of the present invention affords a substantial reduction in manufacturing costs of power operated typewriters.

In addition, the present invention provides simple shock absorbing means in the coupling between the key lever and the operating lever, said means consisting of a slot shaped hole in one of said levers, a pin fixed to the other lever and slidably engaged in the slot hole, and a spring urging the pin toward one end of the slot hole. By this shock absorbing means, impact forces induced in the operating lever by various conditions during the typewriter operation are almost completely absorbed and are prevented from being transmitted to the key lever. Accordingly, the key touch as felt by the operator is extremely pleasant, and smooth, operation of the keys without discomfort is afforded.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What I claim is:
1. A power operated typewriter having
a power roll rotatable about a horizontal axis disposed transversely across the machine,
a driven part to be operated by said power roll,
an actuating member supported at one end on the machine for rocking about a fixed axis which is parallel to and forward of the power roll and having the other end extended rearwardly under said power roll,
said actuating member being operatively connected at the extremity of said extended end to said driven part and being biased toward a normal rest position,
an intermediate member supported rearwardly of the power roll on said actuating member for movement relative to the actuating member and adapted to be engageable with said power roll as a result of said movement,
a key lever depressible into successive first and second positions in the depressing direction,
an L-shaped operating lever pivoted at one end on the frame above said power roll and pivotally connected at its bent portion to the key lever,
the other end of said operating lever being movable in a substantially horizontal direction upon the depression of said key lever and engageable with the intermediate member to cause it to move into engagement with said power roll,
disengaging means on said intermediate member for disengaging the intermediate member from said power roll at the end of forward stroke of the actuating member, and
a repeat cam on said intermediate member,
said other end of the L-shaped operating lever also being positioned in the path of the repeat cam of said intermediate member on the actuating member which is returning to said normal rest position and actuating the intermediate member at the end of the return stroke of the actuating member for causing said intermediate member to re-engage with said power roll by the cam action of said repeat cam when said key lever is depressed into the second position and while being held in said position, whereby repeat operation of the driven part is continued.

2. A power operating typewriter having
a power driven toothed snatch roll rotating continuously in one direction,
a driven part operated by said snatch roll,
an actuating member supported at one end on the machine for rocking about a fixed axis which is parallel to and forward of said snatch roll and having the other end extended rearwardly under the snatch roll,
said actuating member being operatively connected at the exremity of said extended end to said driven part and being biased toward a normal rest position,
a pawl member pivotally mounted rearwardly of the snatch roll on said actuating member so as to engage with the snatch roll and normally held out of the path of the teeth of said snatch roll,
a key lever depressible into successive first and second positions in the depressing direction,
an L-shaped operating lever operatively connected to said key lever and engaging with and rocking the pawl member for causing said pawl member to engage with said snatch roll upon depression of the key lever,
disengaging means on said pawl member disengaging the pawl member from said snatch roll at the end of forward stroke of the actuating member,
a repeat cam on said pawl member,
the free end of the operating lever being positioned in the path of the repeat cam on said pawl member on the actuating member which is returning to said normal rest position and rocking the pawl member at the end of return stroke of the actuating member for causing said pawl member to re-engage said snatch roll by the cam action of said repeat cam when said key lever is depressed into the second position and while being held in said position, whereby repeat operation of the driven part is continued,
and shock absorbing means between said key lever and said operating lever including a spring coupled for permitting said operating lever to rock independently in a counter direction to its operating direction against the force of said spring, whereby direct transmission of the impact force between said actuating lever and said repeat cam to said key lever is prevented when said repeat cam strikes and is in control with the operating lever.

3. A power operated typewriter having
a power driven toothed snatch roll rotating continuously in one direction,
a driven part operated by said snatch roll,
an actuating member operatively connected to said driven part and rockable about a fixed axis parallel to said snatch roll,
a pawl member pivotally mounted on said actuating member and engageable with the snatch roll and normally held outside of the path of the teeth of said snatch roll,
an auxiliary member having an abutment and mounted on said pawl member for movement with said pawl member in one direction and for pivotal movement relative to said pawl member in the other direction about an axis parallel to said snatch roll,
a key lever depressible into successive first and second positions in the depressing direction,
an L-shaped operating lever pivoted at one end on the frame and operatively connected at its bent portion to said key lever,
the other end of the operating lever engaging with said abutment and to rock the auxiliary member with said pawl member in said one direction for causing the pawl member to engage with said snatch roll upon depression of said key lever,
disengaging means on said pawl member for disengaging the pawl member from said snatch roll at the end of the forward stroke of the actuating member,
said auxiliary member engaging with said other end of the operating lever at the end of return stroke of the actuating member and rocked relative to said pawl member in said other direction when said key lever is depressed into the first position and held in said position, whereby single operation of said driven part connected to said actuating member is completed,
a repeat cam on said pawl member,
said repeat cam engaging with the free end of the operating lever at the end of the return stroke of the actuating member for causing said pawl member to re-engage with said snatch roll when said key lever is depressed into the second position and held in said position, whereby repeat operation of the driven part is continued,
and shock absorbing means between said key lever and said operating lever including a spring and so constructed and arranged that the operating lever rocks independently in a counter direction to its operating direction against the force of the spring, whereby direct transmission of the impact force between said other end of the actuating lever and said repeat cam to said key lever is prevented when said repeat cam is struck by said other end of the operating lever.

4. A power operated typewriter having a power roll rotatable about a horizontal axis disposed transversely across the machine,
a driven part operated by said power roll,
an actuating member operatively connected to the driven part and rockable about a fixed axis parallel to the power roll,
an intermediate member movably mounted on said actuating member and engageable with said power roll to transmit the power from said power roll to said driven part,
said intermediate member being normally held in a constant relationship with said actuating member and held in a position out of engagement with said power roll,
a key lever depressible into successive first and second positions in the depressing direction,
an L-shaped operating lever pivoted at one end on the frame and operatively connected at its bent portion to said key lever,
the other end of the operating lever engaging with and rocking the intermediate member for causing the intermediate member to engage with said power roll upon depression of said key lever,
disengaging means on said intermediate member for disengaging the intermediate member from said power roll at the end of forward stroke of the actuating member,
and a repeat cam on said intermediate member,
said other end of the L-shaped operating lever also being positioned within the path of the repeat cam of said intermediate member on the returning actuating member to actuate the intermediate member at the end of the return stroke of the actuating member for causing said intermediate member to re-engage with said power roll when said key lever is depressed into the second position and held in said position, whereby repeat operation of the driven part is continued.

5. A power operated typewriter having
a power roll rotatable about a horizontal axis disposed transversely across the machine,
a driven part operated by said power roll,
an actuating member supported at one end on the frame and rockable about a fixed axis which is parallel to the power roll and operatively connected at its other end to said driven part,
an intermediate member movably mounted on said actuating member and engageable with said power roll to transmit the power from said power roll to said driven part,
said intermednate member being normally held in a position out of engagement with said power roll,
an auxiliary member having an abutment thereon and mounted on said intermediate member for movement with said intermediate member in one direction and for pivotal movement relative to said intermediate member in the other direction about an axis parallel to said power roll,
a key lever depressible into successive first and second positions in the depressing direction,
an L-shaped lever pivoted at one end on the frame and operatively connected at its bent portion to said key lever,
the other end of the operating lever being engageable with said abutment and rocking the auxiliary member along with said intermediate member in said one direction for causing said intermediate member to engage with said power roll upon depression of the key lever,
disengaging means on said intermediate member for disengaging the intermediate member from said power roll at the end of forward stroke of the actuating member,
said auxiliary member engaging said other end of the operating lever at the end of return stroke of the actuating member and rocking relative to said intermediate member in said other direction when said key lever is depressed into the first position and held in said position, whereby single operation of said driven part is completed,
and a repeat cam on said intermediate member,
said other end of the L-shaped operating lever also being positioned in the path of the repeat cam of said intermediate member on the returning actuating member to actuate the intermediate member at the end of the return stroke of the actuating member for causing said intermediate member to re-engage with said power roll when said key lever is depressed into the second position and held in said position, whereby repeat operation of the driven part is continued.

6. A power operated typewriter having
a power roll rotatable about a horizontal axis disposed transversely across the machine, a driven part operated by said power roll,
an actuating member supported at one end on the frame and rockable about a fixed axis which is parallel to the power roll and operatively connected at its other end to said driven part,
an intermediate member movably mounted on said actuating member and engageable with said power roll to transmit the power from said roll to said driven part,
said intermediate member being normally held in a position out of engagement with said power roll,
a key lever depressible into successive first and second positions in the depressing direction,
an L-shaped operating lever pivoted at one end on the frame and operatively connected at its bent portion to said key lever,
the other end of the operating lever being engageable with and rocking the intermediate member for causing the intermediate member to engage with said power roll upon depression of said key lever,
disengaging means on said intermediate member for disengaging the intermediate member from said power roll at the end of forward stroke of the actuating member,
a repeat cam on said intermediate member,
said other end of the L-shaped operating lever also being positioned in the path of the repeat cam of said intermediate member on the returning actuating member and actuating the intermediate member at the end of the return stroke of the actuating member for causing said intermediate member to re-engage with said power roll when said key lever is depressed into the second position and held in said position, whereby repeat operation of the driven part is continued,
and shock absorbing means between said key lever and said operating lever for preventing direct transmission of the impact force between said actuating lever and said repeat cam to said key lever when said repeat cam is struck by and contacted with said operating lever.

7. A power operating typewriter having
a power driven toothed snatch roll rotating continuously in one direction,
a driven part operated by said snatch roll,
an actuating member operatively connected to the driven part and rockable about a fixed axis parallel to said snatch roll,
a pawl member pivotally supported on said actuating member and engageable with the snatch roll and normally held out of the path of the teeth of said snatch roll,
a key lever depressible into successive first and second positions in the depressing direction,
an L-shaped operating lever pivoted at one end on the frame and operatively connected at its bent portion to said key lever,
the other end of the operating lever being engageable with and rocking the pawl member for causing the pawl member to engage with said snatch roll upon depression of said key lever,
disengaging means on said pawl member for disengaging the pawl member from said snatch roll at the end of forward stroke of the actuating member,
and a repeat cam on said pawl member,
said other end of the L-shaped operating lever also being positioned in the path of the repeat cam of said pawl member on the returning actuating member and actuating the pawl member at the end of the return stroke of the actuating member for causing said pawl member to re-engage with said snatch roll when said key lever is depressed into the second position and held in said position, whereby repeat operation of the driven part is continued.

8. A power operated typewriter having
a power driven toothed snatch roll rotating continuously in one direction,
a driven part operated by said snatch roll,
an actuating member supported at one end of the frame and rockable about a fixed axis which is parallel to said snatch roll and operatively connected at its other end to said driven part,
a pawl member pivotally supported on said actuating member and engageable with the snatch roll and normally held outside of the path of the teeth of said snatch roll,
an auxiliary member having an abutment and mounted on said pawl member for movement with said member in one direction and for pivotal movement relative to said pawl member in the other direction about an axis parallel to said snatch roll,
a key lever depressible into successive first and second positions in the depressing direction,
an L-shaped operating lever pivoted at one end on the frame and operatively connected at its bent portion to said key lever,
the other end of the operating lever engaging with said abutment and rocking the auxiliary member with said pawl member in said one direction for causing said pawl member to engage with said snatch roll upon depression of the key lever,
disengaging means on said pawl member for disengaging the pawl member from said snatch roll at the end of forward stroke of the actuating member,
said auxiliary member being engageable with the end portion of the operating lever at the end of return stroke of the actuating member and rockable relative to said pawl member in said other direction when said key lever is depressed into the first position and held in said position, whereby single operation of said driven part is completed,
and a repeat cam on said pawl member,
said other end of the L-shaped operating lever also being positioned within the path of the repeat cam of said pawl member on the returning actuating member to actuate the pawl member at the end of the return stroke of the acutating member for causing said pawl member to re-engage with said snatch roll when said key lever is depressed into the second position and held in said position, whereby repeat operation of the driven part is continued.

9. A power operated typewriter having
a power driven toothed snatch roll rotating continuously in one direction,
a driven part operated by said snatch roll,
an actuating member supported at one end on the frame for rocking about a fixed axis which is parallel to the snatch roll and operatively connected at its other end to said driven part,
a pawl member pivotally mounted on said actuating member and engageable with the snatch roll and normally held out of the path of the teeth of said snatch roll,
a key lever depressible into successive first and second positions in the depressing direction,
an L-shaped operating lever pivoted at one end on the frame and operatively connected at its bent portion to said key lever,
the other end of the operating lever being engageable with and rocking the pawl member for causing the pawl member to engage with said snatch roll upon depression of said key lever,
disengaging means on said pawl member for disengaging the pawl member from said snatch roll at the end of forward stroke of the actuating member,
a repeat cam on said pawl member,
said other end of the L-shaped operating lever also being positioned in the path of the repeat cam of said pawl member on the returning actuating member to actuate the pawl member at the end of the return stroke of the actuating member for causing said pawl member to re-engage with said snatch roll when said key lever is depressed into the second position and held in said position, whereby repeat operation of the driven part is continued, and shock absorbing means between said key lever and said operating lever for preventing direct transmission of the impact force between said operating lever and repeat cam to said key lever when said repeat cam is struck by and contacted with the operating lever.

References Cited

UNITED STATES PATENTS

| | | | |
|---|---|---|---|
| 1,873,441 | 8/1932 | Mack | 197—17 |
| 1,929,975 | 10/1933 | Hokanson | 197—17 |
| 2,600,200 | 6/1952 | Brink | 197—17 |
| 2,714,948 | 8/1955 | Schremp et al. | 197—17 |
| 2,723,740 | 11/1955 | Toeppen | 197—17 |
| 2,798,584 | 7/1957 | Kennedy | 197—17 |
| 3,225,884 | 12/1965 | Krauss et al. | 197—17 |

ROBERT E. PULFREY, *Primary Examiner.*

E. S. BURR, *Assistant Examiner.*